United States Patent [19]

Miyamatsu et al.

[11] 4,070,885
[45] Jan. 31, 1978

[54] APPARATUS FOR SIMULTANEOUSLY DEFORMING AND COATING

[75] Inventors: Yasunori Miyamatsu; Hisakazu Yasumuro, both of Yokohama; Kenichi Miyata, Kawasaki; Takashi Shimizu; Kikuo Matsuoka, both of Yokohama, all of Japan

[73] Assignee: Toyo Seikan Kaisha Limited, Japan

[21] Appl. No.: 731,570

[22] Filed: Oct. 12, 1976

Related U.S. Application Data

[62] Division of Ser. No. 578,019, May 16, 1975.

[30] Foreign Application Priority Data

May 21, 1974 Japan .................................. 49-56103

[51] Int. Cl.² .......................... B05C 1/02; B21D 22/06
[52] U.S. Cl. .......................................... 72/46; 118/44; 118/243

[58] Field of Search ............. 113/80 R, 80 BA, 80 D, 113/80 AD, 80 BD; 118/44, 421, 243; 427/230, 231, 234, 239, 275–277, 287, 286; 72/41–47

[56] References Cited

U.S. PATENT DOCUMENTS 2,838,416  6/1958  Babiarz et al. ..................... 118/44 X Primary Examiner—Morris Kaplan
Attorney, Agent, or Firm—Diller, Brown, Ramik & Wight

[57] ABSTRACT

Stamping means in a single stroke initially passes upwardly through a pool of coating material to collect coating stuff on the face of the die element, then through a restricted opening formed integral with the coating material reservoir to remove excess coating stuff from the periphery of the die and finally into functional engagement with a substrate to simultaneously deform and coat the substrate.

10 Claims, 12 Drawing Figures

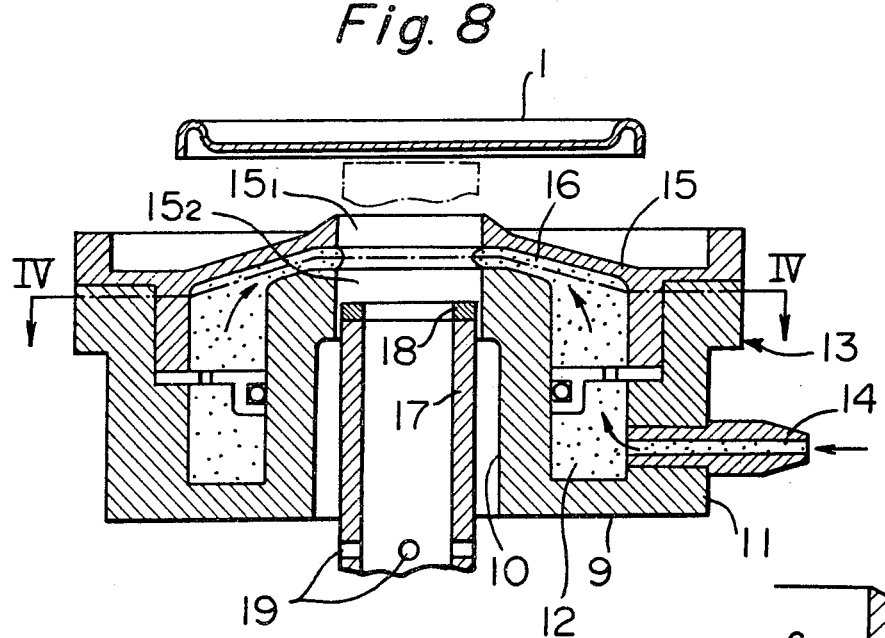
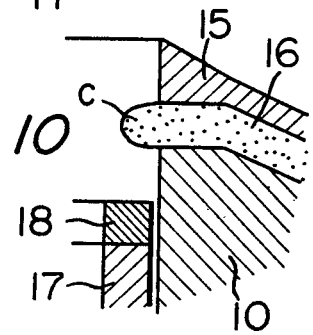
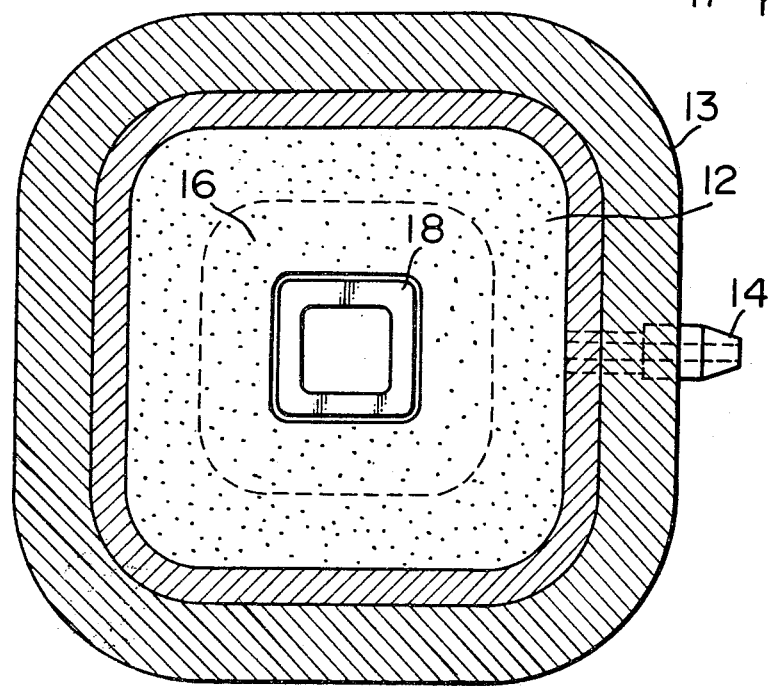

APPARATUS FOR SIMULTANEOUSLY DEFORMING AND COATING

This is a division of application Ser. No. 578,019, filed May 16, 1975.

This invention relates to an apparatus for applying a sealant along the edges of opening portions of a can end having a curled portion for seaming.

In the past, a cut was formed by a can opener along the inside periphery of a can body having a seamed end in order to take out its contents, such as alcoholic liquors, beverages and liquid seasonings, but the recent trend is that one or more opening portions are formed in the can end and the contents of the can are taken out utilizing the opening portions. For example, the opening portions can be opened easily by pushing them with a finger tip.

It is generally known that such a device is very convenient. But in order to render it feasible, great efforts have previously been made, and these prior efforst will be briefly described below.

The can end portion is processed in the following manner prior to can end seaming. A greater part of the opening portion is sheared, and the peripheral edge of the sheared portion on the side of the opening is formed to superpose it on the inside surface of the can end. A sealant is applied to the periphery of the inner surface of the cut portion of the opening in order to protect it. Then, the sealant is gelatinized in an oven. When the sheared portion is pressed externally with a finger tip, for example, the sheared portion of the opening covered with the sealant is broken. If a sealant containing suitable components is coated, the opening portion can somewhat withstand pressures applied externally and internally of the can, and serves to prevent the leakage of the contents. In addition, the sealant applied does not interfere with the opening of the can.

However, the application of the sealant presents the following difficulties. For example, a sealant comprising polyvinyl chloride, a plasticizer, a stabilizer and other additives has a viscosity of about 3,000 to 4,000 centipoises at 40° C. Because of such a high viscosity, the sealant is difficult to apply in small portions, and this causes such defects as the lack of uniform coating or the inability to perform the sealant-applying operation on a mass-production basis. Several coating devices have previously been invented, but with these conventional devices, the output is still as low as, for example, about 75 per minute at most. If it is increased beyond this limit, various defects are brought about.

Recently, there has been a stronger demand for increased productivity, and the goal to achieve has been considered to be about 300 per minute. According to this invention, contrivances have been made to achieve this goal. In the conventional technique, a stamping die moving vertically up and down is let fall into a tank containing a sealant, and after the lapse of a certain period of time, the sealant bulges over the peripheral edge of the stamping die. The bulging sealant is cut off by the raising of the die and utilized for application to can ends. With such a method, it is difficult to realize mass-production. In the present invention, these difficulties have been overcome, and a special method has been devised to push off the sealant. As a result, the output has been increased to about 300 per minute.

According to the present invention, the stamping die is not caused to thrust into a sealant, but is allowed to move up and down freely in space. The sealant is extruded by an external pressure onto the upper surface of the die from a narrow slit surrounding the die. The extruded sealant is received by the rising die. This is the main feature of the present invention.

It is an object of this invention to provide an apparatus for applying a sealant to a can end with increased output per unit time, wherein the sealant is extruded by an external pressure onto the top surface of the die from a narrow slit surrounding the die. Another object of this invention is to provide a method and an apparatus for applying a suitable amount of a sealant uniformly onto the back surface of the opening portion of a can end.

The invention will be described in greater detail by reference to the accompanying drawings in which:

FIGS. 8 and 9 show one embodiment of the present invention, FIG. 8 being a side elevation in vertical section, and FIG. 9 being a top plan thereof;

FIG. 10 is a detailed view of a part of the embodiment of the present invention which shows that the sealant has been extruded toward the stamping die;

Figure 1:
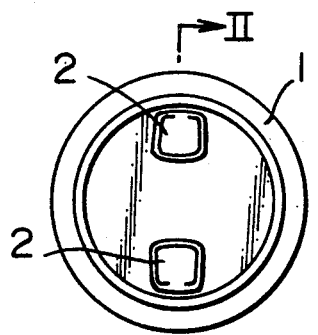
FIGS. 1, 2 and 3 illustrate the shapes of an ordinary can end having opening portions, FIG. 1 being a top plan, FIG. 2 being a side elevation taken on the line II—II of FIG. 1, and FIG. 3 being a detailed view of the opening portion of the can end.
Figure 2:
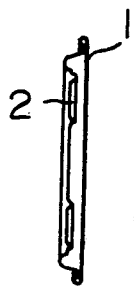
Figure 3:
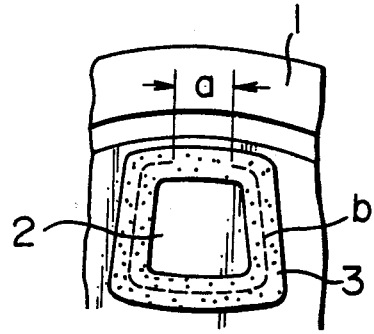

The opening portions of a can end are illustrated, for example, in FIGS. 1, 2 and 3. One or two opening portions 2 are provided in a can end 1. When the opening portions 2 are pushed from outside, they can be easily opened. In other words, the opening portions have a sheared portion, and are broken at this part. In FIG. 3, the dotted line b represents the sheared portion, and the solid line a shows a non-sheared part. The sheared portion is required to be reinforced from its back by applying a sealant 3. This state is shown by dots in FIG. 3. One example of the sealant is a composition consisting of polyvinyl chloride, a plasticizer, a stabilizer and other additives which has a viscosity at 40° C. of 3,000 to 4,000 centipoises. Because of such a high viscosity, the sealant is not easy to apply, and various difficulties are encountered in an ateempt to ensure coating uniformity or mass-production. There have been several conventional apparatuses for applying such a sealant, and one of them used in Japan is illustrated in FIGS. 4 and 5.

Figure 4:
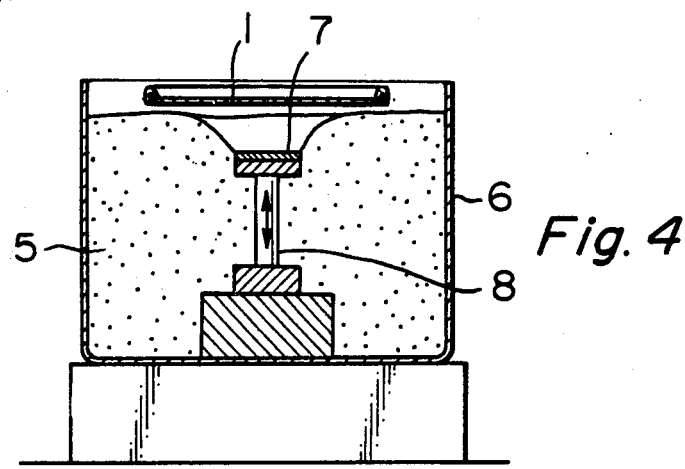
FIGS. 4 and 5 illustrate an apparatus for applying a sealant by a conventional method in Japan, FIG. 4 being a side elevation in vertical section, and FIG. 5 being a top plan thereof.
Figure 5:
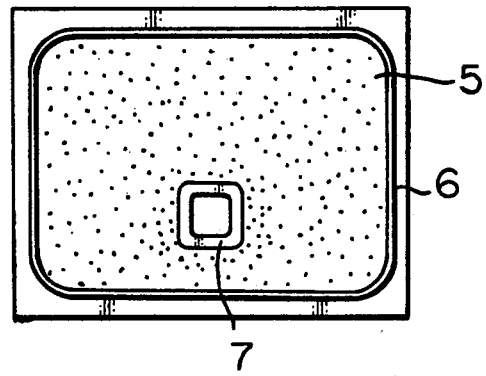

Referring to FIGS. 4 and 5, a tank 6 containing a sealant 5 is installed on the floor. A can end 1 is firmly held by a support (not shown) located above the tank 6. A vertically slidable plunger 8 is provided within the tank 6, and a stamping die 7 is fitted upwardly to the top of the plunger 8. In operation, the plunger 8 descends to allow the stamping die 7 to sink into the sealant 5, whereby a suitable amount of the sealant adheres to the surface of the die 7. Then, the plunger 8 is raised, and the stamping die 7 is brought into contact with the back surface of the can end 1. This results in the adhesion of the sealant to the edge of the opening portions 2. In the next step, the can end 1 is delievered, and upon the feeding of the following can end, the plunger 8 is caused to descend and allow the stamping die 7 to sink into the sealant 5. The stamping die 7 rises after receiving a suitable amount of the sealant. Then, in the same manner as above, the sealant is adhered to the edge of the opening portions 2. The above operation is repeated.

Figure 6:
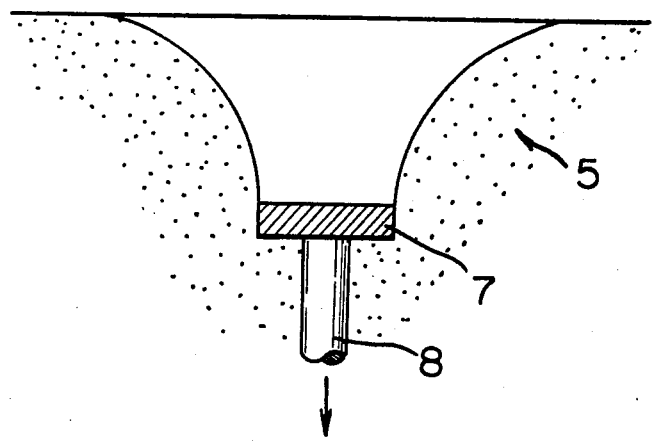
FIGS. 6 and 7 show the relation between a sealant and a stamping die in a conventional sealant-applying apparatus used in Japan.

Recently, there has been a demand for an increase in productivity. From this standpoint, the above conventional sealant-applying apparatus was examined. As a result, it was found that the output obtainable with this apparatus is 75 pieces per minute, and various difficulties are experienced if attempt is made to increase the productivity. The reason for the inefficiency of the conventional sealant-applying apparatus can be seen by reference to FIGS. 6 and 7. Since the sealant 5 is such a high viscosity as mentioned above, when the stamping die 7 is let fall into a tank filled with the sealant, it is not immersed easily in the sealant. As is shown in FIG. 6, the sealant forms a curved surface upwardly from the edge of the die 7 and does not ride over the surface of the die 7.

Figure 7:
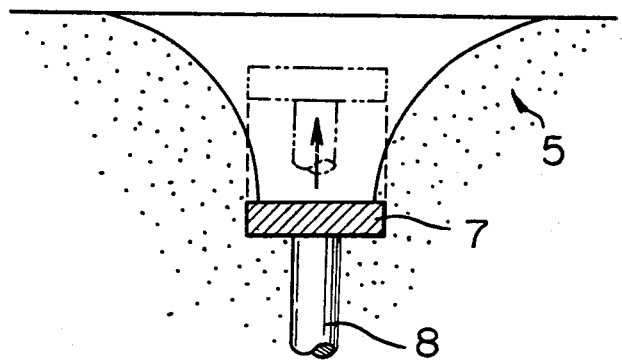

However, after a lapse of a certain very short period of time, the sealant undergoes the action of gravity, and as shown in FIG. 7, the lower portion of the curved surface bulges over the edge of the top surface of the stamping die 7. When the stamping die 7 rises, a small amount of the sealant is pushed off and adhered to peripheral edge of the top surface of the die 7, and then utilized for sealant application. It has already been known that with reference to FIG. 7, the amount of the sealant bulging over the top surface of the stamping die is greatly affected by changes in the level of the sealant within the tank. For example, the level of the sealant is required to change within ± 0.5 mm. The amount of the sealant applied is also greatly affected by the speed of the stamping die. Thus, for mass-production, say, for production of 300 cans per minute, many difficulties are encountered because of the above problem of the level of the sealant and the speed of the die, and it is difficult to apply the sealant uniformly in a suitable amount.

The present invention has overcome the above difficulties, and attained a marked improvement in productivity.

One embodiment of the present invention is illustrated in FIGS. 8 and 9. Generally, two opening portions are simultaneously stamped, but at times, they are individually stamped separately. For the convenience of description, the latter case will be mentioned hereinbelow. The sealant-applying apparatus of this invention includes an outer frame 13 made up of a bottom portion 9, an inside wall 10, and an outside wall 11. The outer frame 13 has a chamber 12 therein for accomodating a sealant. An inlet port 14 for the sealant is provided in the outside wall 11, and a cover portion 15 is fitted to the upper part of the outer frame 13. A central hole $15_2$ is formed in the inside wall 10 of the outer frame 13, and a central hole $15_1$ is also provided in the cover portion 15. These central holes $15_1$ and $15_2$ have the same central axis and the same inside diameter. A space 16 is provided between the top surface of the inside wall 10 and the undersurface of the cover portion 15 at its center.

A plunger 17 is provided so as to move up and down along the central holes $15_1$ and $15_2$ by an external force (not shown). A stamping die 18 is fitted to the top of the plunger 17.

A small clearance is formed between the peripheral wall of the stamping die 18 and the inner walls of the central holes $15_1$ and $15_2$. The plunger 17 has an air vent 19 for communication between the inside of the plunger 17 and the outer atmosphere. A can end 1 is disposed above the stamping die 18, and held by an upper frame (not shown). Can ends are successively fed synchronously with the motion of the stamping die 18. The stamping die 18 rises to a position shown by the dotted line to adhere the sealant to the undersurface of the can end 1. When the die 18 then begins to descend, the can end 1 moves away, and a fresh can end is fed there. The stamping die 18 descends to a predetermined position, and stops there momentarily to receive a fresh supply of the sealant, after which it rises again to apply the sealant to the fresh can end. In the above manner, the movement of can ends is synchronized with the supply of the sealant.

The most important feature of the present invention is the state in which the sealant is about to ride on the stamping die 18. This is illustrated in FIG. 10. The sealant $c$ is extruded as shown from a slit 16 formed between the cover portion 15 and the top surface of the inside wall 10. In the meantime, the stamping die 18 rises from below to scrape off the protruding sealant $c$. Since the sealant is of high viscosity, the excessive sealant adheres to the outside of the die 18. The excess of the sealant is removed by the inside wall of the central hole $15_1$ of the cover portion 15. In other words, the inside wall of the central hole $15_1$ plays an important role of removing the excess of the sealant which adheres to the outside of the die 18.

The principal features of this invention are to cause the sealant $c$ to protrude from the slit 16 and then to remove the excess of the sealant from the die 18 by means of the inside wall of the central hole $15_1$.

The sealant heated to a suitable temperature outside the sealant-applying device is pushed into the chamber 12 from the inlet port 14. In order to achieve this, the sealant is placed to a predetermined height in a separate container (not shown). This container is connected to the inlet port 14, and a predetermined difference in height is provided between the container and the inlet port 14. This ensures a very stable extrusion of the sealant.

The air vent 19 is provided in the plunger 17 for the following reason. When the stamping die 18 rises to apply the sealant to the undersurface of the can end and is about to depart, a slight negative pressure occurs within the plunger 17. This negative pressure is negated by letting air in through the air vent 19 provided at the lower part of the plunger 17. If there is no air vent, the negative pressure will affect the sealant and is likely to impair the uniformity of the pattern of the sealant.

Figure 11:
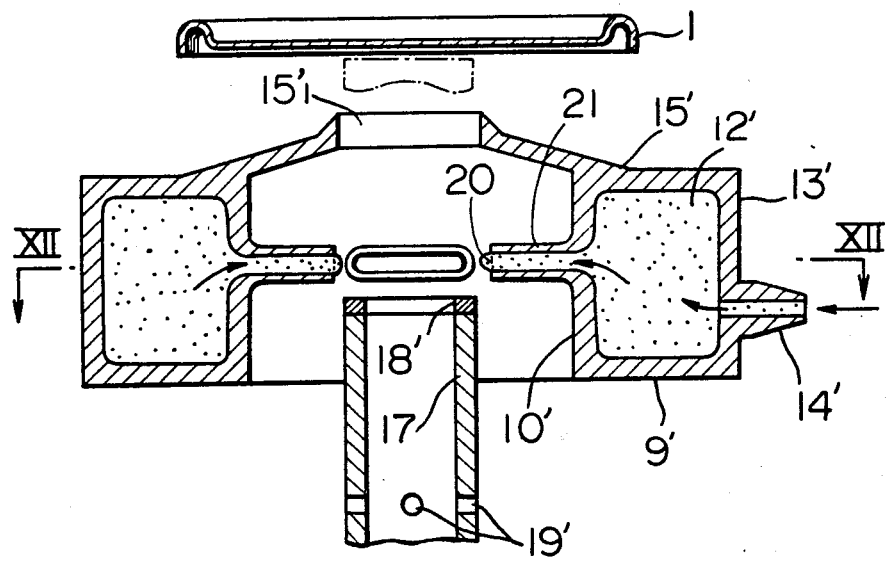
FIGS. 11 and 12 show another embodiment of this invention, FIG. 11 being a side elevation in vertical section, and FIG. 12 being a top plan thereof.
Figure 12:
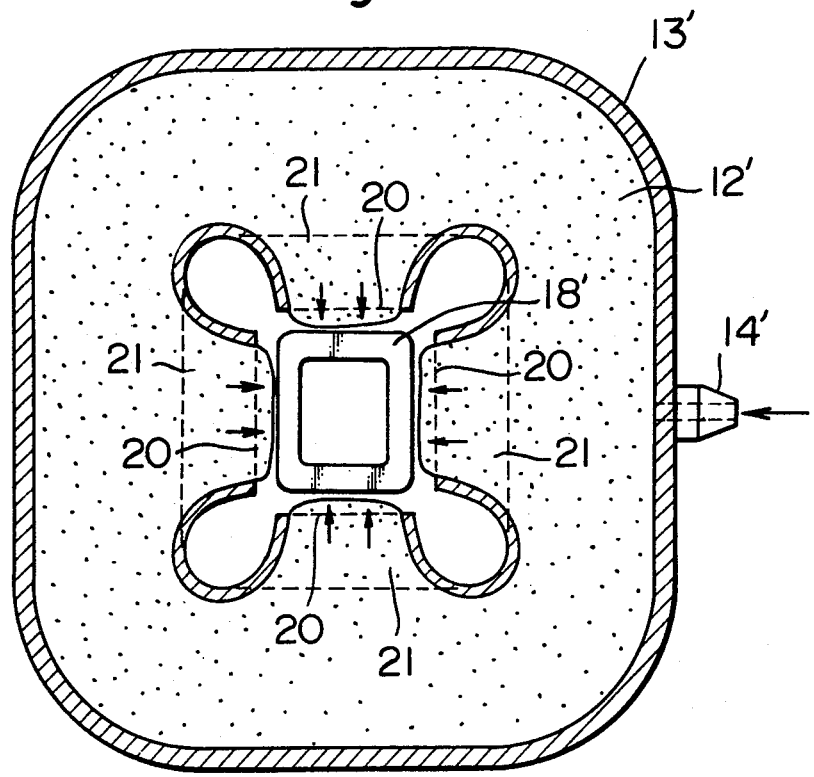

Another embodiment of the present invention is illustrated in FIGS. 11 and 12. The general construction of this embodiment is similar to that shown in FIGS. 8 and 9. The difference lies in an extrusion outlet for the sealant. This embodiment comprises a plurality of flat nozzles 20 disposed around a stamping die 18'. The flat nozzles 20 communicate with an annular chamber 12' for accomodating the sealant. The chamber 12' has an inlet 14'. A cover 15' is formed in the upper portion of the chamber 12'. The cover 15' includes a central hole $15'_1$, and a small space is formed between the central hole $15'_1$ and the stamping die 18'. The excessive sealant adhering to the outside of the die 18' is removed by the inner wall of the central hole $15'_1$. As a whole, the sealant stuffed into the chamber 12' from the inlet 14' is extruded from the flat nozzles 20 in the state shown in FIG. 10.

What we claim is:

1. An apparatus for applying a sealant to the inside surface of opening portions of a can end having a curled portion for seaming in order to reinforce it and to prevent leakage of the contents of the can, said apparatus comprising a vertically movable plunger having a top, a stamping die fitted to said plunger top, said stamping die being movable between a lower position and an elevated sealant applying position, a frame defining a chamber surrounding said plunger for accommodating sealant and a cover for said chamber, an inlet port for sealant provided in a side surface of said frame, a central hole provided in each of said frame and said cover so as to permit the vertical movement of the stamping die therethrough, the relative dimensions of said central holes and said stamping die providing a narrow clearance between the stamping die and the central holes thereby removing excess sealant adhering to the periphery of the stamping die, said frame having an inside wall defining said central hole in said frame and a slit formed in the inside wall of the frame below the cover and above said stamping die lower position so as to surround the stamping die for extruding the sealant therethrough toward the upper surface of the periphery of the stamping die at the predetermined lower position of the stamping die.

2. The apparatus of claim 1 wherein said plunger is tubular and is open at its top, said stamping die having an open center in communication with the interior of said, plunger and an external air vent in said plunger spaced below said top.

3. The apparatus of claim 1 wherein said sealant is provided at said inlet port at a uniform pressure for uniformly extruding sealant through said slit.

4. The apparatus of claim 3 wherein said inlet port is disposed at a lower portion of said chamber.

5. The apparatus of claim 3 wherein said inlet port is disposed at a lower portion of said chamber, and said slit is disposed at the top of said chamber immediately below said cover with said cover forming an upper boundary of said slit.

6. The apparatus of claim 5 wherein said slit is continuous about the periphery of said central hole in said frame.

7. The apparatus of claim 1 wherein said central hole in said frame is defined by a plurality of circumferentially disposed nozzles extending inwardly from the side wall of said frame.

8. The apparatus of claim 7 wherein said nozzles are separate in closely spaced adjacent relation.

9. The apparatus of claim 7 wherein that portion of said cover having said central hole formed therein is spaced from said nozzles.

10. The apparatus of claim 1 wherein that portion of said cover having said central opening therein is spaced from said slit.

* * * * *